July 17, 1951 P. V. SHELL 2,560,605
AUTOMATIC BASTER
Filed Feb. 24, 1948
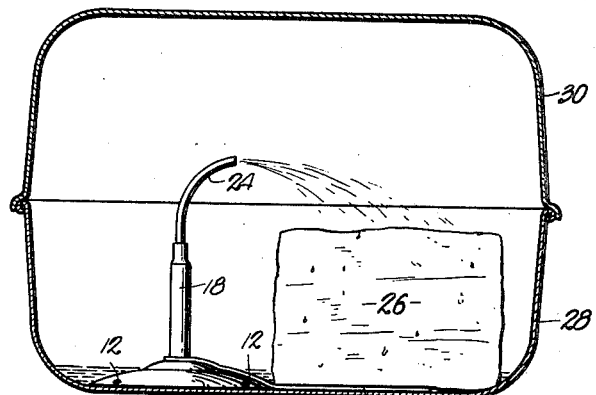
Fig. 1.
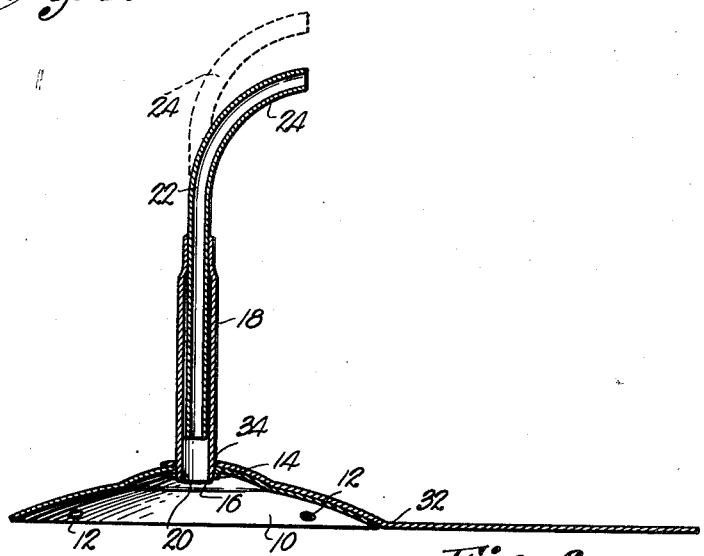
Fig. 2.
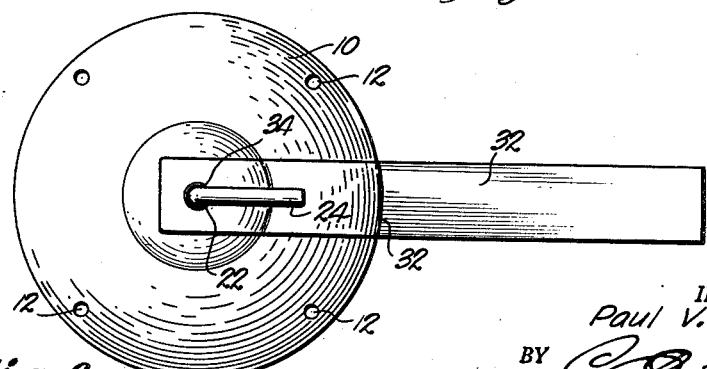
Fig. 3.
INVENTOR.
Paul V. Shell
BY
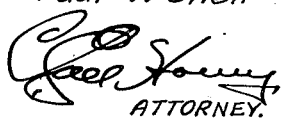
ATTORNEY.

Patented July 17, 1951

2,560,605

UNITED STATES PATENT OFFICE 2,560,605

AUTOMATIC BASTER

Paul V. Shell, Kansas City, Mo.

Application February 24, 1948, Serial No. 10,450

1 Claim. (Cl. 99—346)

This invention relates to the art of cooking and preparing foods and has particular reference to implements or devices employed in the baking of meats, fowls, fish or the like in an oven where it is desirable to apply collected grease or fats from the bottom of the baking pan to the upper regions of the food being prepared.

One of the primary objects of this invention is to provide a cooking implement of the aforementioned character that may be easily and quickly positioned in a baking pan and anchored therein through the weight of the food being prepared so that the expelling spout forming a portion thereof may direct liquid grease or food juices to the upper portion of the food being baked.

Another important aim of this invention is to provide a baster appliance for cooking utensils that is made in a number of separable parts that are capable of being quickly and easily assembled by the housewife and which permit the necessary adjustment of the component elements of the baster so that it may be used in baking pans of various sizes and employed to baste pieces of food of various contours and sizes.

Further objects of this invention will appear during the course of the following specification, referring to the accompanying drawing, wherein:

Fig. 1 is a side elevational view of the automatic baster showing the same in use.

Fig. 2 is an enlarged vertical central sectional view through the same baster; and Fig. 3 is a top plan view of the automatic baster.

It is well known that the roasting of foods in an oven or a closed receptacle such as a baking dish or the like, tends to harden the upper portions of the food that are not submerged within or adjacent to the volume of food juices or fats that collect in the bottom of the holder therefor. Usually, when a fowl or a piece of meat is being roasted, the operator will periodically baste the upper portion thereof by dipping collected juices from the bottom of the pan and applying the same to the top of the food being prepared. This task becomes laborious and oftentimes is neglected entirely to such an extent that the food is not evenly cooked and the upper portion thereof becomes so hard and dry that it is not edible.

The automatic baster made in accordance with my invention is capable of being positioned within a cooking utensil and held in place by the weight of the foods to the upper part of which the collected food juices are directed by a portion of the baster.

In the preferred form of my invention, the assembly comprises a dish-shaped perforated dome or base 10 formed of sheet material or the like. While aluminum has been found satisfactory, it is understood that this base 10 may be formed of plastic or other substance that will withstand the heat and not be detrimental to or react upon the foodstuffs with which the baster is employed. Base 10 has a number of perforations 12 provided therein at the marginal edge thereof and the uppermost portion of the base 10 has a boss 14 surrounding a hole 16, the surface whereof is tapered as illustrated in Fig. 2.

A hollow tube 18, having a tapered portion 20 at one end thereof, is arranged to snugly fit hole 16 in dome 10 when the parts of the baster are assembled. This tube 18 extends upwardly or outwardly from dome 10 and is substantially vertical when the baster is in use.

An expelling spout 22, formed of tubular stock is in telescoping engagement with tube 18 and the dimensions of these elements 18 and 22 are such as to establish a frictional engagement therebetween. Thus, when expelling spout 22 is manually adjusted to a desired position with respect to the outermost end thereof, the frictional inter-engagement between these parts will insure that the spout will not be displaced during the cooking operation. The upper portion of expelling spout 22 is arched as clearly shown in Figs. 1 and 2 to present a short portion that is disposed radially to overlie base 10. This arched portion 24 terminates in the open outlet end of spout 22 and when the food is being prepared, as shown in Fig. 1, this portion 24 of spout 22 will effectively direct the juices onto the top of any food that is being prepared. This food 26 is illustrated in Fig. 1 as being a roast positioned in a baking pan 28 having a lid or cover 30. An anchor 32 extends radially from base 10 and beneath food 26 to cause the weight of the latter to hold the entire basting assembly against accidental displacement. More specifically, anchor 32 in the form illustrated, comprises a strip of suitable material contoured along a portion of its length to snugly fit the top of base 10 and having an opening 34 to receive tube 18. This opening 34 is appreciably larger than the outside diameter of tube 18 and, therefore, permits free rotation of anchor 32 about the axis of said tube 18.

When the baster is being located within the utensil 28, anchor 32 is free to move and permit the operator to dispose the anchor beneath the heaviest portion of food 26. It is sometimes desirable to employ a conventional rack which is a part of the standard cooking utensil in lieu of anchor 32 but it is necessary in the interest of efficient operation, to positively provide a hold-down or anchor for base 10.

When the parts are assembled and used in a manner illustrated in Fig. 1, the juices of the food 26 collect in the bottom of utensil 28 and enter the hollow base 10 through perforations 12. There the confined juices are elevated through tube 18 and spout 22 and expelled out the end of this spout 22 into a desired place over the food 26. The base and tube 10 and 18 respectively, need not be disturbed if the operator desires to adjust the expelling spout 22 and all that is necessary in such instance is to draw the spout longitudinally and turn the same about its axis of rotation in tube 18 so that the outlet end of spout 22 is positioned properly with regard to the food 26.

Spout 22 may be easily and completely removed from within tube 18 when the device is not used or when it is necessary to clean the same. Tube 18 likewise may be quickly withdrawn from hole 16 and anchor 32 is easily disassociated from tube 18 and base 10. Thus all of the component parts of the baster may be individually treated and washed as well as stored, thereby conserving space and rendering sanitary the entire appliance.

It is realized that the specific form and character of the parts forming the baster may be altered and made different from those illustrated and described and, therefore, it is desired to be limited only by the scope of the following claim.

Having thus described the invention, what is claimed as new and desired to be secured by Letters Patent is:

An automatic baster for food cooking utensils comprising a hollow spheroidal body provided with a normally lowermost, uninterrupted annular edge, a perforation at the axis and normally highest point thereof and a number of spaced, marginal holes adjacent said edge; a vertical tube having a tapered portion at the lower end thereof for frictional engagement with the body when inserted in said perforation; a tubular expelling spout telescoped within the upper end of said tube for relative longitudinal and rotative movement therein, said spout having an arcuate portion at its outer end for laterally discharging material therethrough, the telescoped portion of the spout being in frictional engagement with the tube for holding said spout in a predetermined position; and an elongated, relatively narrow anchor strip having an opening formed in one end thereof circumscribing the tube for free and full rotation of the strip entirely about the tube in overlying, sliding engagement with the outer face of the body and extending beyond said annular edge of the body, that portion of the strip engaging the body being in conformity with the contour thereof, that portion of the strip beyond the body being flat and in the plane of said annular edge of the body.

PAUL V. SHELL.

REFERENCES CITED

The following references are of record in the file of this patent:

UNITED STATES PATENTS

| Number | Name | Date |
| --- | --- | --- |
| 2,164,072 | Kitzeman | June 27, 1939 |
| 2,352,292 | Schaefer | June 27, 1944 |